United States Patent
Hagedoorn et al.

(10) Patent No.: US 6,922,374 B2
(45) Date of Patent: Jul. 26, 2005

(54) DOUBLE-ENDED GEOPHONE

(75) Inventors: Arend L. Hagedoorn, Voorschoten (NL); Hendrik A. Laroo, Lisse (NL)

(73) Assignee: Input/Output, Inc., Stafford, TX (US)

( * ) Notice: Subject to any disclaimer, the term of this patent is extended or adjusted under 35 U.S.C. 154(b) by 143 days.

(21) Appl. No.: 09/829,170

(22) Filed: Apr. 9, 2001

(65) Prior Publication Data

US 2002/0145942 A1 Oct. 10, 2002

(51) Int. Cl.[7] .................................................. H04R 9/00
(52) U.S. Cl. ..................................... 367/182; 367/178
(58) Field of Search ................................ 367/178, 182, 367/185, 188; 310/337

(56) References Cited

U.S. PATENT DOCUMENTS

| | | | |
|---|---|---|---|
| 2,959,240 A | 11/1960 | Schmuck | 181/0.5 |
| 3,239,804 A | 3/1966 | Elskamp et al. | 340/17 |
| 3,451,040 A | 6/1969 | Johnson, III | 340/17 |
| 3,557,184 A | 5/1971 | McNeel et al. | 340/17 |
| 3,582,875 A | 6/1971 | Van Wambeck et al. | 340/17 |
| 3,738,445 A | 6/1973 | Wilson et al. | 181/0.5 |
| 3,878,504 A | 4/1975 | Sears | 340/17 |
| 3,890,606 A | 6/1975 | Florian et al. | 340/17 |
| 3,913,063 A | 10/1975 | Sears | 340/17 |
| 3,953,829 A | 4/1976 | Boyle | 340/17 |
| 4,144,520 A | * 3/1979 | McNeel | 367/183 |
| 4,152,692 A | 5/1979 | McNeel | 340/17 |
| 4,159,464 A | * 6/1979 | Hall, Jr. | 367/182 |
| 4,326,275 A | * 4/1982 | Butler | 367/160 |
| 4,685,094 A | 8/1987 | Vitringa et al. | 367/183 |
| 4,972,390 A | * 11/1990 | Pagliarini, Jr. | 310/337 |
| 4,996,674 A | * 2/1991 | Thompson | 367/158 |
| 5,475,652 A | * 12/1995 | McNeel et al. | 367/188 |
| 5,742,562 A | * 4/1998 | Marschall et al. | 367/188 |

FOREIGN PATENT DOCUMENTS

GB 2022359 A 12/1979

* cited by examiner

*Primary Examiner*—Ian J. Lobo
(74) *Attorney, Agent, or Firm*—Madan, Mossman & Sriram, P.C.

(57) ABSTRACT

A geophone including conductive terminals positioned on opposite sides of the geophone housing. The geophone includes a pair of coils resiliently mounted within the geophone housing and a magnet. A first end plate, a first spring, and a first coil support provide a first end of the electrically conductive path. A second end plate, a second spring, and a second coil support provide a second end of the electrically conductive path. The first and second end of the electrically conductive path are electrically insulated from each and the geophone housing. Providing one or more remaining components with electrically non-conductive surfaces provides electrical insulation.

26 Claims, 2 Drawing Sheets

DOUBLE-ENDED GEOPHONE

BACKGROUND OF THE INVENTION

This invention relates generally to geophones, and in particular to double-ended geophone structures.

Geophones are devices which sense motion by suspending an inertial reference mass structure from a rigid, fixed supporting structure. Typically, the mass is a coil form suspended by springs in a magnetic field, one spring being attached at each end of the coil form. The springs position the coil form within the magnetic field so that the coil form is centered laterally and along its axis within the magnetic field. The springs also form a suspension system having a predetermined resonant frequency.

Geophones may be used in a variety of applications such as, but not limited to, seismic operations on land, in boreholes, in mines, and under water. The operating principle is the same regardless of the application or environment. In seismic operations, seismic waves are imparted into the earth's crust at or near the earth's surface, and portions of those seismic waves are reflected or refracted from the boundaries of subsurface layers. Geophones are generally arranged in arrays or groups on the earth's surface, and when the reflected or refracted waves encounter a geophone, the coil form, which is suspended between the two springs, tends to remain substantially motionless relative to the geophone housing while the geophone housing and its connected magnetic circuit moves with the earth's surface. The movement of the coil form through a magnetic field causes a voltage to be generated at the output of the geophone. The outputs of the arrays of geophones are recorded in a form that permits analysis. Skilled interpreters can discern from the analysis the shape of subsurface formations, and the likelihood of finding an accumulation of minerals, such as oil and gas.

In geophones, both ends of the electrical path have to be electrically insulated from each other and the outside case of the geophone. Typical conventional geophones satisfy this requirement by using insulation sleeves, insulation disks, and other similar devices. Such devices complicate the assembly of the geophone. Furthermore, in typical conventional geophones, both of the signal terminals are positioned on the same side of the geophone. This construction further complicates the assembly.

The present invention is directed to overcoming one or more of the limitations of the existing geophones.

SUMMARY OF THE INVENTION

According to one aspect of the invention, a geophone is provided that includes a housing, a first terminal, an electrically conductive path having a first end and a second end, a first coil, a second terminal, a second coil, and a magnet. The first terminal is positioned on one side of the housing. The first end of the electrically conductive path is coupled to the first terminal. The first coil is resiliently mounted within the housing and is coupled to the first end of the electrically conductive path. The second terminal is positioned on another side of the housing. The second end of the electrically conductive path is coupled to the second terminal. The second coil is resiliently mounted within the housing and is coupled to the second end of the electrically conductive path. The first and second coils are electrically connected to complete the electrically conductive path. The magnet is mounted within the housing.

According to another aspect of the present invention, a geophone is provided that includes a housing having a first end and a second end opposite the first end, first and second end plates, first and second end plate supports, first and second magnet supports, a magnet, first and second resilient rings, first and second springs, first and second coils supports, and first and second coils. The first end plate is coupled to the first end of the housing. The second end plate is coupled to the second of the housing. The first end plate support is coupled to the first end plate. The second end plate support is coupled to the second end plate. The first magnet support is coupled to the first end plate support. The second magnet support is coupled to the second end plate support. The magnet is coupled to the first and second magnet supports. The first resilient ring is coupled to the first end plate support. The second resilient ring is coupled to the second end plate support. The first spring is coupled to the first end plate support. The second spring is coupled to the second end plate support. The first coil support is coupled to the first spring. The second coil is coupled to the second spring. The first coil is coupled to the first coil support. The second coil is coupled to the second coil support. The first coil support is rigidly coupled to the second coil support.

According to another aspect of the present invention, a geophone is provided that includes a housing, an electrically conductive terminal on one end of the housing, another electrically conductive terminal on the opposite end of the housing, a magnet within housing, and at least one coil resiliently mounted within the housing.

According to another aspect of the present invention, a method of electrically insulating a first electrically conductive component from at least one second electrically conductive component within a geophone by treating at least a portion of the surface of the first component to render the portion electrically insulative.

According to another aspect of the present invention, a seismic acquisition system is provided that includes at least one geophone and a controller. Each geophone includes a housing, first and second electrically conductive terminals, first and second coils, and a magnet. The first electrically conductive terminal is positioned on one side of the housing. The first coil is resiliently mounted within the housing and is operably coupled to the first terminal. The second electrically conductive terminal is positioned on another side of the housing. The second coil is resiliently mounted within the housing and is operably coupled to the second terminal. The magnet is mounted within the housing. The controller is operably coupled the geophone.

DETAILED DESCRIPTION OF THE ILLUSTRATIVE EMBODIMENTS

A geophone for use in a seismic acquisition system is provided. The geophone preferably includes a pair of terminals that are positioned on opposite sides of the geophone housing for providing an electrical connection to the geophone coils. The electrically conductive path within the geophone is preferably provided by conductive end plate supports, resilient springs, and coil supports. The remaining portions of the geophone are preferably electrically isolated from the conductive path by providing at least some of the components with electrically non-conductive surfaces. While illustrated in terms of a specific example of a geophone, the teachings of the present disclosure will have wide application to the design of electrical devices generally wherein conventional electrical isolation using ceramic, paper, plastics, and other materials is improved through the use of appropriate surface treatments to eliminate the need for additional insulation materials.

Figure 1:
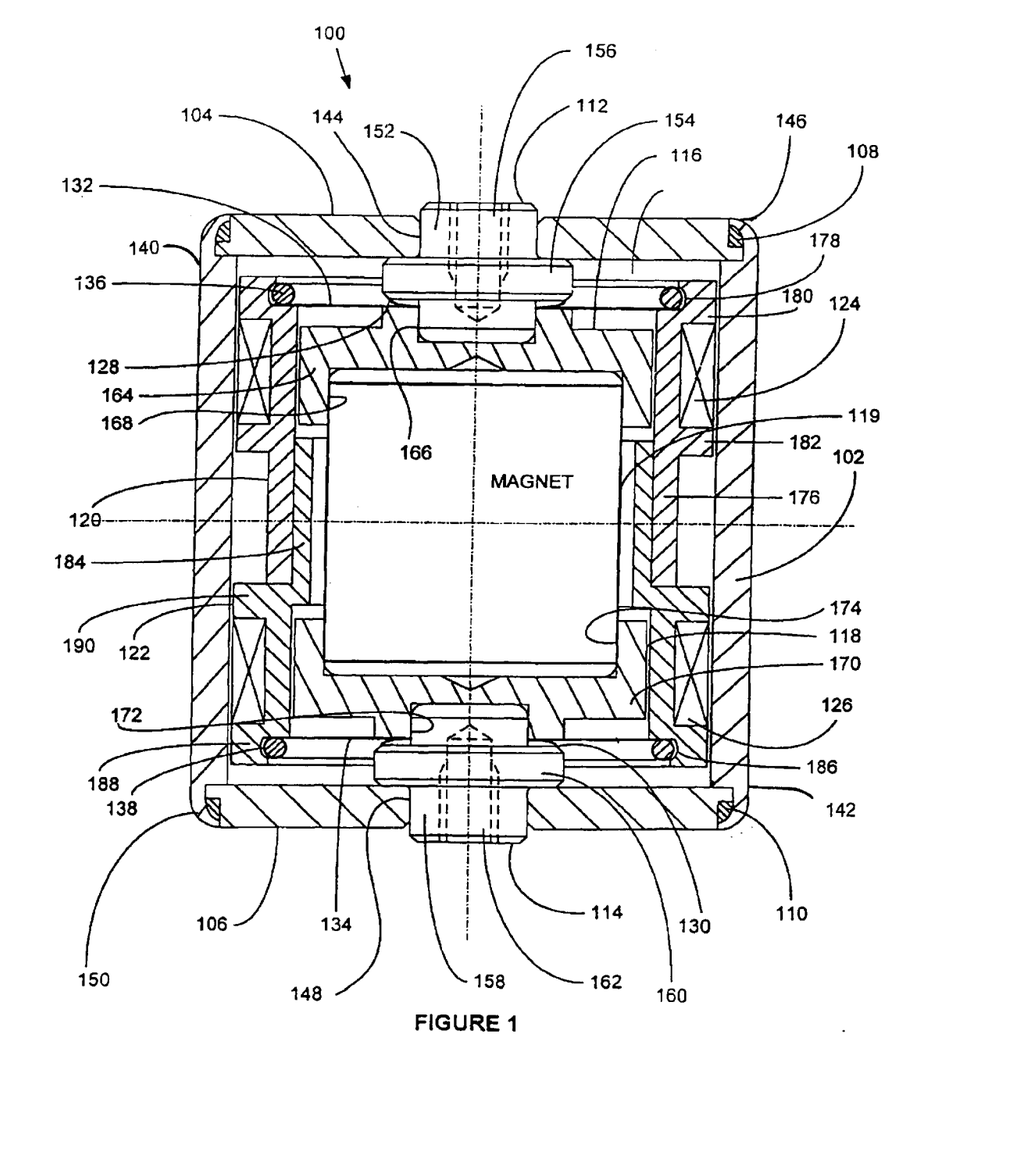
FIG. 1 is a cross-sectional illustration of a geophone.

Referring initially to FIG. 1, a preferred embodiment of a geophone 100 includes a housing 102, a first end plate 104, a second end plate 106, a first end seal 108, a second end seal 110, a first end plate support 112, a second end plate support 114, a first magnet support 116, a second magnet support 118, a magnet 119, a first coil support 120, a second coil support 122, a first coil 124, a second coil 126, a first resilient ring 128, a second resilient ring 130, a first spring 132, a second ring 134, a first retaining ring 136, and second retaining ring 138.

The housing 102 includes a first end 140 and a second end 142. The housing 102 preferably has an annular cross-section. The housing 102 may be fabricated from any number of conventional commercially available materials modified in accordance with the teachings of the present disclosure.

The first end plate 104 is coupled to the first end 140 of the housing 102. The first end plate 104 is preferably disk-shaped. The first end plate 104 preferably includes an opening 144. In a preferred embodiment, the opening 144 is centrally positioned and is substantially circular. In a preferred embodiment, the first end plate 104 is coupled to the first end 140 of the housing 102 by a crimped connection 146 in which the first end 140 of the housing 102 is crimped over the first end plate 104. In a particularly preferred embodiment, the seal 108 is positioned within the crimped connection 146 to provide a water-tight seal.

The first end plate 104 may be fabricated from any number of conventional commercially available materials modified in accordance with the teachings of the present disclosure. In a particularly preferred embodiment, the surface of the first end plate 104 is electrically non-conductive. In a preferred embodiment, the surface of the first end plate 104 is made non-conductive by the application of a conventional non-conductive coating using conventional processes such as, for example, spray coating, dipcoating, or evaporation coating. Alternatively, conventional methods may be used to apply a nonconductive layer such as an oxidized layer or anodized layer to the end plate surface. Alternatively, a non-conductive layer is provided using a combination of the application of a non-conductive coating and an anodized layer or an oxidized layer.

The second end plate 106 is coupled to the second end 142 of the housing 102. The second end plate 106 is preferably disk-shaped. The second end plate 106 preferably includes an opening 148. In a preferred embodiment, the opening 148 is centrally positioned and is substantially circular. In a preferred embodiment, the second end plate 106 is coupled to the second end 142 of the housing 102 by a crimped connection 150 in which the second end 142 of the housing 102 is crimped over the second end plate 106. In a particularly preferred embodiment, the seal 110 is positioned within the crimped connection 150 to provide a water-tight seal.

The second end plate 106 may be fabricated from any number of conventional commercially available materials modified in accordance with the teachings of the present disclosure. In a particularly preferred embodiment, the surface of the second end plate 106 is electrically non-conductive. In a preferred embodiment, the surface of the second end plate 106 is made non-conductive by the application of a non-conductive coating using conventional processes such as, for example, spray coating, dipcoating, or evaporation coating. Alternatively, a non-conductive surface is provided through the application of an oxidized layer or anodized layer using conventional methods. Alternatively, a non-conductive coating is provided using a combination of the application of a non-conductive coating and an oxidized layer or anodized layer.

In several alternative embodiments, the first end plate 104 and the second end plate 106 may be fabricated from any number of conventional commercially available non-conductive materials.

The first end seal 108 preferably provides a water tight seal between the first end 140 of the housing 102 and the first end plate 104. The first end seal 108 may comprise any number of conventional commercially available seals modified in accordance with the teachings of the present disclosure.

The second end seal 110 preferably provides a water-tight seal between the second end 142 of the housing 102 and the second end plate 106. The second end seal 110 may comprise any number of conventional commercially available seals modified in accordance with the teachings of the present disclosure.

The first end plate support 112 is coupled to the first end plate 104. In a preferred embodiment, then first end plate support 112 is mounted within the opening 144 in the first end plate 104. In a preferred embodiment, the first end plate support 112 is centrally positioned within and supported by the edge of the opening 144 in the first end plate 104.

The first end plate support 112 preferably includes a substantially cylindrical body 152 having a flange 154, and a female contact 156. One end of the cylindrical body 152 is mounted within and supported by the edge of the opening 144. The flange 154 serves to position and support the first end plate support 112 against the first end plate 104. The other end of the cylindrical body 152 is positioned on the other side of the flange 154 and preferably supports and positions the first magnet support 116. The female contact 156 preferably is adapted to receive and mate with a male contact (not illustrated) in order to transmit electrical signals. In one embodiment, the female contact is a threaded hole. In several alternative embodiments, the first end plate support is equipped with a male contact or a solder point or a solder patch.

The first end plate support 112 may be fabricated from any number of conventional commercially available materials modified in accordance with the teachings of the present disclosure. In a particularly preferred embodiment, the surface of the first end plate support 112 is highly electrically conductive. In a preferred embodiment, the surface of the first end plate support 112 is resistant to oxidation. In a particularly preferred embodiment, the surface, or the entire body, of the first end plate support 112 is fabricated from gold.

In an alternative preferred embodiment, the first end plate 104 and the first end plate support 112 are combined into a single element with the outer radial surface of the single element provided with an electrically insulative surface treatment and the inner redial surface of the single elements provided with an electrically conductive surface treatment, which may be electrically connected to a (not shown) electrically conductive part on the outside of this single element, to act as a terminal. In an alternative embodiment, the first end plate 104 and the first end plate support 112 are both made out of an electrically conductive material and are coupled together using an insulative glue or other suitable adhesive.

The second end plate support 114 is coupled to he second end plate 106. In a preferred embodiment, the second end plate support 114 is mounted within the opening 148 in the second end plate 106. In a preferred embodiment, the second end plate support 114 is centrally positioned within and supported by the edge of the opening 148 in the second end plate 106.

The second end plate support 114 preferably includes a substantially cylindrical body 158 having a flange 160, and a female contact 162. One end of the cylindrical body 158 is mounted within and supported by the edge of the opening 148. The flange 160 serves to position and support the second end plate support 114 against the second end plate 106. The other end of the cylindrical body 158 is positioned on the other side of the flange 160 and preferably supports and positions the first magnet support 118. The female contact 162 preferably is adapted to receive and mate with a male contact (not illustrated) in order to transmit electrical signals. In one embodiment, the female contact is a threaded hole. In several alternative embodiments, the first end plate support is equipped with a male contact or a solder point or a solder patch.

The second end plate support 114 may be fabricated from any number of conventional commercially available materials modified in accordance with the teachings of the present disclosure. In a particularly preferred embodiment, the surface of the second end plate support 114 is highly electrically conductive. In a preferred embodiment, the surface of the second end plate support 114 is resistant to oxidation. In a particularly preferred embodiment, the surface, or the entire body, of the second end plate support 114 is fabricated from gold.

In an alternative preferred embodiment, the second end plate and the second end plate support 114 are combined in a single element with the outer radial surface of the single element provided with an electrically insulative surface treatment while the inner radial surface of the single element is provided with an electrically conductive surface treatment, which may be electrically connected to an electrically conductive part (not shown) on the outside of this single element, to act as a terminal. In an alternative embodiment, the first end plate 104 and the first end plate support 112 are both made out of a electrically conductive material and are coupled together using an insulative glue or other suitable adhesive.

The first magnet support 116 is coupled to and supported by the first end plate support 112. The first magnet support 116 is further coupled to the magnet 119 and, in combination with the second magnet support 118, supports the magnet 119. In a preferred embodiment, the first magnet support 116 comprises a substantially cylindrical body 164 including a first opening 166 and a second opening 168. In a preferred embodiment, the first magnet support 116 is supported by and mounted upon the cylindrical body 152 of the first end plate support 112. In a particular preferred embodiment, one end of the cylindrical body 152 of the first end plate support 112 mates with the first opening 166 of the first magnet support 116. In a preferred embodiment, one end of the magnet 119 mates with the second opening 168 of the first magnet support 116. In a preferred embodiment, the first and second openings 166 and 168 are centrally positioned within the cylindrical body 164 of the first magnet support 116.

The first magnet support 116 may be fabricated from any number of conventional commercially available materials modified in accordance with the teachings of the present disclosure. In a preferred embodiment, the surface of the first magnet support 116 is electrically insulative. In a preferred embodiment, the surface of the first magnet support 116 is made non-conductive by the application of a non-conductive coating using conventional processes such as, for example, spray coating, dipcoating, or evaporation coating. Alternatively, a non-conductive surface is provided through the application of an oxidized layer or an anodized layer using conventional methods. Alternatively, a non-conductive coating is provided using a combination of the application of a non-conductive coating and an oxidized layer or an anodized layer.

The second magnet support 118 is coupled to and supported by the second end plate support 114. The second magnet support 118 is further coupled to the magnet 119 and, in combination with the first magnet support 116, supports the magnet 119. In a preferred embodiment, the second magnet support 118 comprises a substantially cylindrical body 170 including a first opening 172 and a second opening 174. In a preferred embodiment, the second magnet support 118 is supported by and mounted upon the cylindrical body 158 of the second end plate support 114. In a particularly preferred embodiment, one end of the cylindrical body 158 of the second end plate support 114 mates with the first opening 172 of the second magnet support 118. In a particularly preferred embodiment, one end of the magnet 119 mates with the second opening 174 of the second magnet support 118. In a preferred embodiment, the first and second openings 172 and 174 are centrally positioned within the cylindrical body 170 of the second magnet support 118.

The second magnet support 118 may be fabricated from any number of conventional commercially available materials modified in accordance with the teachings of the present disclosure. In a preferred embodiment, the surface of the second magnet support 118 is electrically insulative. In a preferred embodiment, the surface of the second magnet support 118 is made non-conductive by the application of a non-conductive coating using conventional processes such as, for example, spray coating, dipcoating, or evaporation coating. Alternatively, a non-conductive surface is provided through the application of an oxidized layer using conventional methods. Alternatively, a non-conductive coating is provided using a combination of the application of a non-conductive coating and an oxidized layer or an anodized layer.

The magnet 119 is coupled to and supported by the first and second magnet supports, 116 and 118. As will be recognized by persons having ordinary skill in the art, the magnet 119 may comprise a single magnet or a stack of magnets. In a preferred embodiment, one end of the magnet 119 mates with the second opening 168 of the first magnet support 116 and the other end of the magnet 119 mates with the second opening 174 of the second magnet support 118. In an alternative embodiment, the magnet is glued to at least one of the magnet supports with an electrically nonconductive glue.

In a preferred embodiment, the surface of the magnet 119 is electrically non-conductive. In a preferred embodiment, the surface of the magnet 119 is made non-conductive by the application of a non-conductive coating using conventional processes such as, for example, spray coating, dipcoating, or evaporation coating. Alternatively, a non-conductive surface is provided through the application of an oxidized layer using conventional methods. Alternatively, a non-conductive coating is provided using a combination of the application of a non-conductive coating and an anodized layer.

The first coil support 120 is coupled to and supported by the first spring 132. The first coil support 120 is further coupled to and supports the first coil 124. In a preferred embodiment, the first coil support 120 includes an annular body 176 including an inner slot 178 and a pair of outer flanges, 180 and 182. In a preferred embodiment, the inner slot 178 receives an outer portion of the first spring 132 and, in conjunction with the first retaining ring 136 mounts the first coil support 120 onto the first spring 132. In a preferred embodiment, the first coil 124 is mounted upon the surface of the first coil support 120 within the annular region bounded by the pair of outer flanges, 180 and 182.

In a preferred embodiment, the surface of the first coil support 120 separated from the surface of the housing 102 by an air gap in order to electrically isolate and permit relative motion between the two elements. Likewise, the surface of the first coil support 120 is also preferably separated from the surface of the first magnet support 116 in order to electrically isolate and permit relative motion between the two elements.

The first coil support 120 may be fabricated from any number of conventional commercially available materials modified in accordance with the teachings of the present disclosure. In a preferred embodiment, the surface of the first coil support 120 is made non-conductive by the application of a non-conductive coating using conventional processes such as, for example, spray coating, dipcoating, or evaporation coating. Alternatively, a non-conductive coating is provided through the application of an oxidized layer using conventional processes. Alternatively, a non-conductive surface is provided by the application of a combination of a non-conductive coating and an anodized layer. In another embodiment, the coil support 120 is manufactured from an electrically non-conductive material.

The second coil support 122 is coupled to and supported by the second spring 134. The second coil support 122 is further coupled to and supports the second coil 126. In a preferred embodiment, the second coil support 122 includes an annular body 184 including an inner slot 186 and a pair of outer flanges, 188 and 190. In a preferred embodiment, the inner slot 186 receives an outer portion of the second spring 134 and, in conjunction with the second retaining ring 138 mounts the second coil support 122 onto the second spring 134. In a preferred embodiment, the second coil 126 is mounted upon the surface of the second coil support 122 within the annular region bounded by the pair of outer flanges, 188 and 190.

In a preferred embodiment, the surface of the second coil support 122 is separated from the surface of the housing 102 by an air gap in order to electrically isolate and permit relative motion between the two elements. Likewise, the surface of the second coil support 122 is also preferably separated from the surface of the second magnet support 118 in order to electrically isolate and permit relative motion between the two elements.

The second coil support 122 may be fabricated from any number of conventional commercially available materials modified in accordance with the teachings of the present disclosure. In a preferred embodiment, the surface of the second coil support 122 is made non-conductive by the application of a non-conductive coating using conventional processes such as, for example, spray coating, dipcoating, or evaporation coating. Alternatively, a non-conductive coating is provided through the application of an oxidized layer using conventional processes. Alternatively, a non-conductive surface is provided by using a combination of a non-conductive coating and an anodized layer. In another embodiment, the second coil support 122 is manufactured from an electrically non-conductive material.

In a preferred embodiment, the first and second coil supports, 120 and 122, are electrically insulated from each using conventional methods and apparatus.

The first coil 124 is coupled to and supported by the first coil support 120. In a preferred embodiment, the first coil 124 is mounted upon the surface of the first coil support 120 within the annular region bounded by the pair of outer flanges, 180 and 182. The general design, construction and operational features of such coils are otherwise well known to persons having ordinary skill in the art.

The second coil 126 is coupled to and support by the second coil support 122. In a preferred embodiment, the second coil 126 is mounted upon the surface of the second coil support 122 within the annular region bounded by the pair of outer flanges, 188 and 190. The general design, construction and operational features of such coils are otherwise well known to persons having ordinary skill in the art.

The first coil 124 and the second coil 126 are electrically connected. The general design, construction and operational features of this connection are otherwise well known to persons having ordinary skill in the art.

The first resilient ring 128 is coupled to and supported by the first end plate support 112. In a preferred embodiment, the first resilient ring 128 is mounted upon the body 152 of the first end plate support 112 between the flange 154 and the first magnet support 116. In a particularly preferred embodiment, the first resilient ring 128 is mounted upon the body 152 of the first end plate support 112 between the flange 154 and the first magnet support 116 such that it exerts a retaining force upon the first spring 132.

The first resilient ring 128 may comprise any number of conventional commercially available resilient rings modified in accordance with the teachings of the present disclosure.

The second resilient ring 130 coupled to and supported by the second end plate support 114. In a preferred embodiment, the second resilient ring 130 is mounted upon the body 158 of the second end plate support 114 between the flange 160 and the second magnet support 118. In particularly preferred embodiment, the second resilient ring 130 is mounted upon the body 158 of the second end plate support 114 between the flange 160 and the second magnet support 118 such that it exerts a retaining force upon the second spring 134.

The second resilient ring 130 may comprise any number of conventional commercially available resilient rings modified in accordance with the teachings of the present disclosure.

The first spring 132 is coupled to the first end plate support 112. The first spring 132 is also coupled to the first coil support 120. In this manner, the first spring 132 permits the first coil to move relative to the magnet 119.

In a preferred embodiment, an outer edge of the first spring 132 is mounted in the inner recess 178 of the first coil support 120 using the first retaining ring 136. In a preferred embodiment, an inner edge of the first spring 132 is mounted on the first end plate support 112 between the flange 154 and the first magnet support 116. In a particularly preferred embodiment, the inner edge of the first spring 132 is mounted on the first end plate support 112 between the flange 154 and the first magnet support 116 with the first resilient ring 128 providing a retaining force upon the first spring 132.

As will be recognized by persons having ordinary skill in the art, the first spring 132 may comprise an inner ring and an outer ring that are connected by one or more resilient arms. The first spring 132 may comprise any number of conventional commercially available resilient rings modified in accordance with the teachings of the present disclosure.

The second spring 134 is coupled to the second end plate support 114. The second spring 134 is also coupled to the second coil support 122. In this manner the second spring 134 permits the second coil to move relative to the magnet 119.

In one embodiment, the first coil support 120 and the second coil support 122 are rigidly connected to form one moving body. The first spring 132 and the second spring 134 support the combined coil supports 120 and 122, both in the radial in the axial direction, around the magnet.

In a preferred embodiment, an outer edge of the second spring 134 is mounted in the inner recess 186 of the second coil support 122 using the second retaining ring 138. In a preferred embodiment, an inner edge of the second spring 134 is mounted on the second end plate support 114 between the flange 160 and the second magnet support 118. In a particularly preferred embodiment, the inner edge of the second spring 134 is mounted on the second end plate support 114 between the flange 160 and the second magnet support 118 with the second resilient ring 130 providing a retaining force upon the second spring 134.

As will be recognized by persons having ordinary skill in the art, the second spring 134 may comprise an inner ring and an outer ring that are connected by one or more resilient arms. The second spring 134 may comprise any number of conventional commercially available resilient rings modified in accordance with the teachings of the present disclosure.

The first retaining ring 136 is coupled to and mounted upon the first coil support 120. In a preferred embodiment, the first retaining ring 136 is resiliently mounted within the recess 178 of the first coil support 120. In this manner, the first retaining ring 136 holds the outer edge of the first spring 132 within the recess 178 of the first coil support.

The first retaining ring 136 may comprise any number of commercially available retaining rings modified in accordance with the teachings of the present disclosure.

The second retaining ring 138 is coupled to and mounted upon the second coil support 122. In a preferred embodiment, the second retaining ring 138 is resiliently mounted within the recess 186 of the second coil support 122. In this manner, the second retaining ring holds the outer edge of the second spring 134 within the recess 186 of the second coil support.

The second retaining ring 138 may comprise any number of commercially available retaining rings modified in accordance with the teachings of the present disclosure.

The geophone 100 preferably provides a conductive electrical path that is insulated form the housing 102, with opposing ends of the electrical path insulated from each other.

In a preferred embodiment of the geophone 100, one end of the conductive electrical path includes the first end plate support 112, the first resilient ring 128, the first spring 132, the first coil support 120, and the first coil 124. The opposing end of the electrical path includes the second coil 126, the second coil support 122, the second spring 134, the second resilient ring 138, and the second end plate support 114. The first coil 124 and the second coil 126 are electrically connected to combine the first end of the electrical path with the second, or opposing end, of the electrical path to form one electrical circuit. The electrical path through the magnet supports 116 and 118 and the magnet 119 is prevented by the electrically insulative surfaces of at least one of these elements. The electrical path to the housing 102 is prevented by the electrically insulative surfaces of the end plates of 104 and 106. In alternative preferred embodiments, the electrically insulative surface treatment is omitted from the first and second magnet support 116 and 118, the first magnet support 116 and the magnet 119, the magnet 119 and the second magnet support 118, the first magnet support 116, the second magnet support 118, or the magnet 119.

In an alternative embodiment, the magnet 119 is divided into an upper portion and a lower portion. The upper portion and the lower portion are mechanically connected. This connection can be direct or with the use of extra rings or bushes. The surface of the magnets, or of one of the magnets, has been modified so that the combination is nonconductive. It is also possible that a ring or bushing, which connect both halves of the magnet, has a nonconductive surface or is made out of a nonconductive material.

In this manner, the geophone 100 is provided with electrical terminals on opposite sides of the housing 102 using a conductive path that is electrically isolated using components having electrically insulative surface treatments. In this manner, the use of conventional insulating rings, bushes, ceramic insulators, glass seals, and similar devices is eliminated or reduced. This results in a geophone design that is simpler to manufacture and more resistant to mechanical shocks and vibration.

In an alternative embodiment, the size of the electrical terminals, in the form of the end plate supports 112 and 114, may be enlarged to comprise the totality of end portions of the geophone 100 by appropriate surface treatments in accordance with the teachings of the present disclosure.

Figure 2:
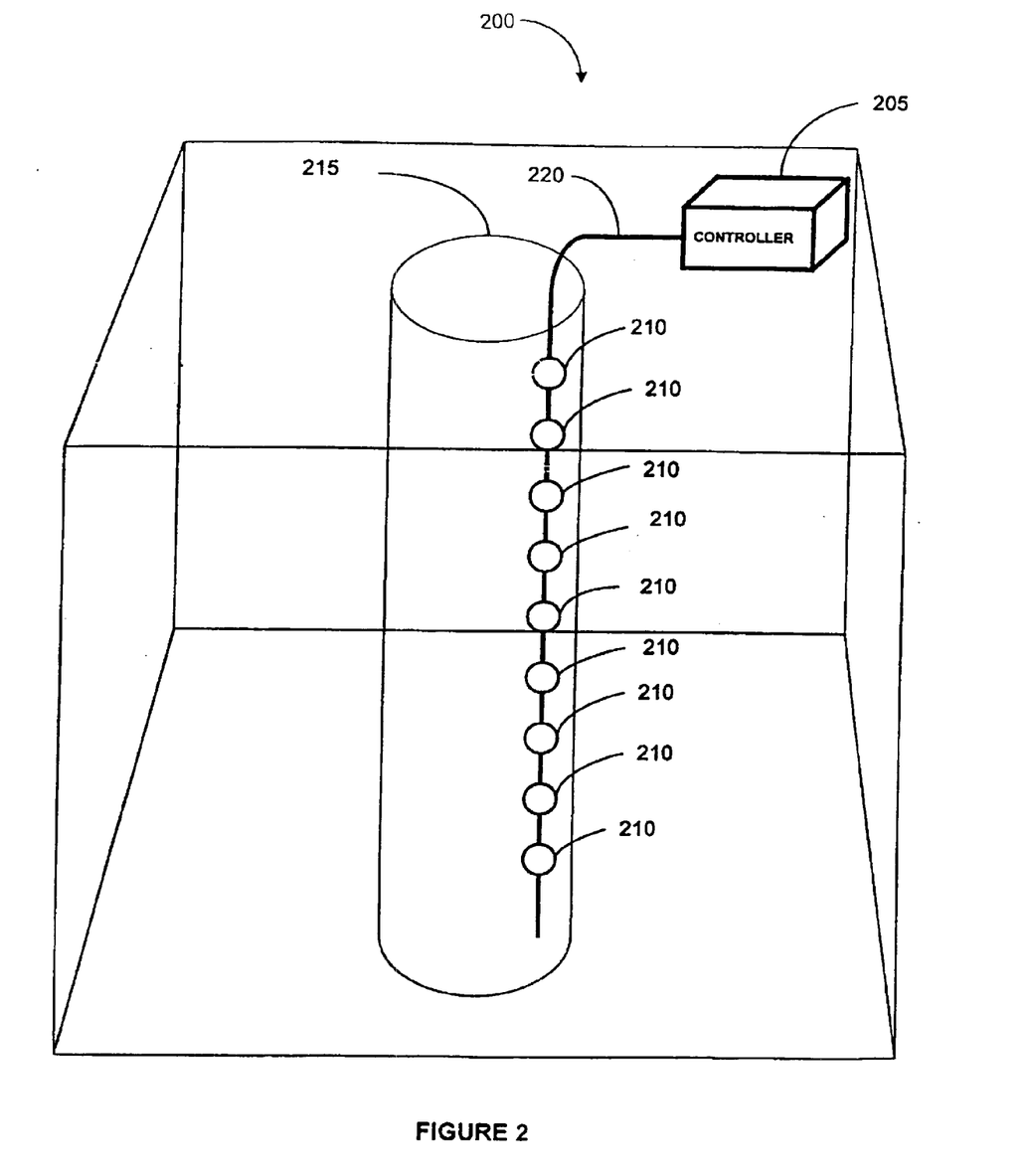
FIG. 2 is a schematic illustration of a seismic acquisition system.

Referring to FIG. 2, a preferred embodiment of seismic acquisition system 200 will now be described. The seismic acquisition system 200 includes a controller 205 and one or more geophones 210. The seismic acquisition system 200 is preferably operated in a wellbore 215 to gather seismic data.

The controller 205 is operably coupled to the geophones 210 and is adapted to monitor and/or control the operation of the geophones 210. The controller 205 may comprise any number of conventional controllers for use in a seismic acquisition system.

The geophones 210 preferably comprise the geophones 100 previously described with reference to FIG. 1. The geophones 210 are operably coupled to the controller 205. In a preferred embodiment, the geophones 210 are operably coupled to the controller 205 using a cabling assembly 220 that includes male contacts that mate with the female contacts of the geophones 210.

A geophone has been described that includes a housing, first and second terminals, first and second end of the electrically conductive path, first and second coils, and a magnet. The first terminal is positioned on one side of the housing. The first end of the electrically conductive path is coupled to the first terminal. The first coil is resiliently mounted within the housing and is coupled to the first end of the electrically conductive path. The second terminal is positioned on another side of the housing. The second end of the electrically conductive path is coupled to the second terminal. The second coil is resiliently mounted within the housing and is coupled to the second end of the electrically conductive path. The magnet is mounted within the housing.

In a preferred embodiment, the first and second ends of the conductive path are electrically insulated from each other. In a preferred embodiment, the magnet, the first end of the conductive path, and the second end of the conductive path are electrically insulated from each other. In a preferred embodiment, the housing, the magnet, the first end of the conductive path, and the second end of the conductive path are electrically insulated from each other. In a preferred embodiment, the first end of the conductive path includes a first end plate support, a first spring, and a first coil support. In a preferred embodiment, the second end of the conductive path includes a second end plate support, a second spring, and a second coil support. In a preferred embodiment, the first end of the conductive path includes a first end plate support, a first spring, and a first coil support, and the second end of the conductive path includes a second end plate support, a second spring, and a second coil support. In a preferred embodiment, the geophone further includes a first magnet support coupled to the housing and the magnet, and a second magnet support coupled to the housing and the magnet. In a preferred embodiment, at least a portion of the surface of the magnet is electrically non-conductive. In a preferred embodiment, at least a portion of the surface of the first magnet support is electrically non-conductive. In a preferred embodiment, at least a portion of the surface of the second magnet support is electrically non-conductive. In a preferred embodiment, at least a portion of the surfaces of the first and second magnet supports are electrically non-conductive. In a preferred embodiment, at least a portion of the surfaces of the magnet, the first magnet support and the second magnet support are electrically non-conductive. In a preferred embodiment, the first end of the electrically conductive path and the second end of the electrically conductive path are electrically insulated by providing one or more of the elements of the geophone with electrically insulative surfaces. In an alternative embodiment, the magnet consists of two halves, which are connected to act magnetically as one magnet. At least a portion of the surfaces of the magnet, or one of the magnets, is made insulative with a suitable surface treatment, so that the combination of the two halves is not electrically conductive. In a preferred embodiment, one or more electrically conductive elements are electrically insulated from one or more other electrically conductive elements by providing one or more intermediate elements having electrically insulative surfaces.

A geophone has also been described that includes a housing, first and second end plates, first and second end plate supports, first and second magnet supports, a magnet, first and second resilient rings, first and second springs, first and second coil supports, and first and second coils. The housing includes a first end and a second end. The first end plate is coupled to the first end of the housing. The second end plate is coupled to the second end of the housing. The first end plate support is coupled to first end plate. The second end plate support is coupled to the second end plate. The first magnet support is coupled to the first end plate support. The second magnet support is coupled to the second end plate support. The magnet is coupled to the first and second magnet supports. The first resilient ring is coupled to the first end plate support. The second resilient ring is coupled to the second end plate support. The first spring is coupled to the first end plate support. The second spring is coupled to the second end plate support. The first coil support is coupled to the first spring. The second coil support is coupled to the second spring. The second spring is coupled to the second end plate support. The first coil support is coupled to the first spring. The second coil support is coupled to the second spring. The first coil coupled to the first coil support. The second coil is coupled to the second coil support.

In a preferred embodiment, the geophone further includes a first retaining ring for coupling the first coil support to the first spring, and a second retaining ring for coupling the second coil support to the second spring. In a preferred embodiment, at least a portion of the surfaces of the first and second end plates are electrically non-conductive. In a preferred embodiment, an electrically insulative coating is affixed to the surfaces of the first and second end plates. In a preferred embodiment, at least a portion of the surfaces of the first and second end plate supports are electrically conductive. In a preferred embodiment, at least a portion of the surfaces of the first and second end plate supports are resistant to oxidation. In a preferred embodiment, at least a portion of the surface of the magnet is electrically non-conductive. In a preferred embodiment, at least a portion of the surface of the first magnet support is electrically non-conductive. In a preferred embodiment, at least a portion of the surface of the second magnet support is electrically non-conductive. In a preferred embodiment, at least a portion of each surface of the first and second magnet supports is electrically non-conductive. In a preferred embodiment, at least a portion of the surfaces of the magnet and the first and second magnet supports are electrically non-conductive. In a preferred embodiment, the first and second coil supports are electrically isolated from each other.

A geophone has also been described that includes a housing, an electrically conductive terminal on one end of the housing, another electrically conductive terminal on the opposite end of the housing, a magnet mounted within the housing, and at least one coil resiliently mounted within the housing.

A method of electrically insulating at least one electrically conductive component from at least one other electrically conductive component within a geophone has also been described that includes providing at least one intermediate component between the at least one electrically conductive component and the at least one other electrically component. Wherein at least a portion of the surface of the at least one intermediate component is electrically insulative.

In a preferred embodiment, the at least one intermediate component comprises a metallic component including an electrically non-conductive surface.

A seismic acquisition system has also been described that includes at least one geophone and a controller. Each geophone includes a housing, first and second electrically conductive terminals, first and second coils, and a magnet. The first electrically conductive terminal is located on one side of the housing. The first coil is resiliently mounted within the housing and is operably coupled to the first terminal. The second electrically conductive terminal is located on another side of the housing. The second coil is resiliently mounted within the housing and is operably coupled to the second terminal. The magnet is mounted within the housing. The controller is operably coupled to the geophone.

In a preferred embodiment, the first and second ends of the conductive path are electrically insulated from each other. In a preferred embodiment, the magnet, the first end of the conductive path, and the end of the second conductive path are electrically insulated from each other. In a preferred embodiment, the housing, the magnet, the first end of the conductive path, and the second end of the conductive path are electrically insulated from each other. In a preferred embodiment, the first end of the conductive path includes a first end plate support, a first spring, and a first coil support. In a preferred embodiment, the second end of the conductive path includes a second end plate support, a second spring, and a second coil support. In a preferred embodiment, the first end of the conductive path includes a first end plate support, a first spring, and a first coil support, and the second conductive path includes a second end plate support, a second spring, and a second coil support. In a preferred embodiment, the geophone further includes a first magnet support coupled to the housing and the magnet, and a second magnet support coupled to the housing and the magnet. In a preferred embodiment, at least a portion of the surface of the magnet is electrically non-conductive. In a preferred embodiment, at least a portion of the surface of the first magnet support is electrically non-conductive. In a preferred embodiment, at least a portion of the surface of the second magnet support is electrically non-conductive. In a preferred embodiment, at least a portion of the surfaces of the first and second magnet supports are electrically non-conductive. In a preferred embodiment, at least a portion of the surfaces of the magnet, the first magnet support and the second magnet support are electrically non-conductive. In a preferred embodiment, the first end of the electrically conductive path and the second end of the electrically conductive path are electrically insulated by providing one or more of the elements of the geophone with electrically insulative surfaces. In a preferred embodiment, one or more electrically conductive elements are electrically insulated from one or more other electrically conductive elements by providing one or more intermediate elements having electrically insulative surfaces.

Although illustrative embodiment of the invention have been shown and described, a wide range of modification, changes and substitutions is contemplated in the in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A geophone, comprising:
   a housing;
   a first terminal positioned on one end of the housing;
   an electrically conductive path formed from a plurality of conductive parts having a first end coupled to the first terminal;
   a first coil resiliently mounted within the housing and coupled to the first end of the electrically conductive path;
   a second terminal positioned on a second end of the housing;
   a second end of the electrically conductive path coupled to the second terminal;
   a second coil resiliently mounted within the housing and coupled to the second end of the electrically conductive path;
   a magnet mounted within the housing; and
   an electrically insulating deposit on a surface of the plurality of conductive parts electrically insulating the pathway from the housing.

2. The geophone of claim 1, wherein the magnet and the electrically conductive path are electrically insulated from each other.

3. The geophone of claim 1, wherein the housing, the magnet, and the electrically conductive path are electrically insulated from each other.

4. The geophone of claim 1, wherein the first end of the conductive path comprises:

a first end plate support;
   a first spring; and
   a first coil support.

5. The geophone of claim 1, wherein the second end of the conductive path comprises:

a second end plate support;
   a second spring; and
   a second coil support.

6. The geophone of claim 4, wherein the second end of the conductive path comprises:

a second end plate support;
   a second spring; and
   a second coil support.

7. The geophone of claim 1, further comprising:

a first magnet support coupled to the housing and the magnet; and
   a second magnet support coupled to the housing and the magnet.

8. The geophone of claim 1, wherein at least a portion of the surface of the magnet is electrically non-conductive.

9. The geophone of claim 7, wherein at least a portion of the surface of at least one of the magnet, the first magnet support and the second magnet support is electrically non-conductive.

10. The geophone of claim 1, wherein one or more electrically conductive elements include insulative surfaces for insulating the one or more electrically conductive elements from one or more other electrically conductive elements.

11. A geophone, comprising:
    a housing including a first end and a second end opposite the first end;
    a first end plate coupled to the first end of the housing;
    a second end plate coupled to the second end of the housing;
    a first end plate support coupled to the first end plate;
    a second end plate support coupled to the second end plate;
    a first magnet support coupled to the first end plate support;
    a second magnet support coupled to the second end plate support;
    a magnet coupled to the first and second magnet supports;
    a first resilient ring coupled to the first end plate support;
    a second resilient ring coupled to the second end plate support;
    a first spring coupled to the first end plate support;
    a second spring coupled to the second end plate support;
    a first coil support coupled to the first spring;
    a second coil support coupled to the second spring;
    a first coil coupled to the first coil support; and
    a second coil coupled to the second coil support, wherein the first end plate support, first resilient ring, first spring, first coil support and first coil are electrically coupled to form a conductive path to the first end, the conductive path being insulated from other conductive parts by an insulating coating deposited on a surface of parts forming the conductive path or on a surface of the other conductive parts.

12. The geophone of claim 11, further comprising:
    a first retaining ring for coupling the first coil support to the first spring; and a second retaining ring for coupling the second coil support to the second spring.

13. The geophone of claim 11, wherein at least a portion of the surface of at least one of the first end plate, the second end plate, the magnet, the first magnet support, the second magnet support, first coil support, and second coil support is electrically non-conductive.

14. The geophone of claim 13, wherein the non-conductive surface is selected from a group consisting of (i) nonconductive paint, (ii) nonconductive adhesive, (iii) an enamel layer, (iv) an oxidized layer, and (v) an anodized layer, affixed to the surface of the portion.

15. The geophone of claim 11, wherein at least a portion of the surfaces of the first and second end plate supports are electrically conductive.

16. The geophone of claim 11, wherein at least a portion of the surfaces of the first and second end plate supports are resistant to oxidation.

17. A seismic acquisition system, comprising:
 at least one geophone, each geophone comprising:
 a housing;
 a first electrically conductive terminal on one end of the housing;
 a first coil resiliently mounted within the housing and operably coupled to the first terminal through a first plurality of conductive parts coupled to form a first conductive pathway, wherein the first conductive pathway is electrically insulated from the housing by a deposit of insulating material deposited on one of the housing and the first plurality of conductive parts;
 a second electrically conductive terminal on a second end of the housing;
 a second coil resiliently mounted within the housing and operably coupled to the second terminal through a second plurality of conductive parts coupled to form a first conductive pathway, wherein the second conductive pathway is electrically insulated from the housing by a deposit of insulating material deposited on one of the housing and the second plurality of conductive parts;
 a magnet mounted within the housing; and
 a controller operably coupled to the geophone.

18. The system of claim 17, wherein the magnet, the first terminal, and the second terminal are electrically insulated from each other.

19. The system of claim 17, wherein the housing, the magnet, the first terminal, and the second terminal are electrically insulated from each other.

20. The system of claim 17, wherein the first terminal comprises:
 a first end plate support;
 a first spring; and
 a first coil support.

21. The system of claim 17, wherein the second terminal comprises:
 a second end plate support;
 a second spring; and
 a second coil support.

22. The system of claim 20, wherein the second terminal comprises:
 a second end plate support;
 a second spring; and
 a second coil support.

23. The system of claim 17, further comprising:
 a first magnet support coupled to the housing and the magnet; and
 a second magnet support coupled to the housing and the magnet.

24. The system of claim 17, wherein at least a portion of the surface of the magnet is electrically non-conductive.

25. The system of claim 23, wherein at least a portion of the surface of at least one of the magnet, the first magnet support and the second magnet support is electrically non-conductive.

26. The system of claim 17, wherein the insulating material includes one of the or more of (i) nonconductive paint, (ii) nonconductive adhesive, (iii) an enamel layer, (iv) an oxidized layer, and (v) an anodized layer.

* * * * *